United States Patent
Bryant et al.

[11] Patent Number: 6,081,373
[45] Date of Patent: Jun. 27, 2000

[54] LIGHT TRANSMITTING DEVICE

[75] Inventors: Mark Alan Bryant, Roanoke; Paul Thomas Schweitzer; James Hoge Bowen, both of Salem; Roger Douglas Whiddon, Roanoke, all of Va.

[73] Assignee: ITT Manufacturing Enterprises, Inc., Wilmington, Del.

[21] Appl. No.: 09/074,796

[22] Filed: May 8, 1998

[51] Int. Cl.$^7$ .................................................. G02B 23/00
[52] U.S. Cl. ........................... 359/424; 359/387; 385/146
[58] Field of Search .................................. 359/353, 364, 359/365, 366, 387, 424, 427, 428, 592, 594; 250/214 VT; 385/146

[56] References Cited

U.S. PATENT DOCUMENTS

| | | | |
|---|---|---|---|
| 804,624 | 11/1905 | Saegmuller | 359/428 |
| 2,472,809 | 6/1949 | Decker | 356/251 |
| 2,577,807 | 12/1951 | Pryor | 356/153 |
| 3,064,526 | 11/1962 | Lindsay | 359/503 |
| 4,749,271 | 6/1988 | Nagler | 359/407 |
| 5,157,553 | 10/1992 | Phillips et al. | 359/744 |
| 5,339,382 | 8/1994 | Whitehead | 385/146 |
| 5,347,397 | 9/1994 | Nelson et al. | 359/629 |
| 5,414,557 | 5/1995 | Phillips | 359/428 |
| 5,537,261 | 7/1996 | Palmer | 359/819 |
| 5,581,683 | 12/1996 | Bertignoll et al. | 385/146 |
| 5,683,831 | 11/1997 | Baril et al. | 429/96 |

*Primary Examiner*—Cassandra Spyrou
*Assistant Examiner*—Mark A. Robinson
*Attorney, Agent, or Firm*—Pollock, Vande Sande & Amernick, R.L.L.P.

[57] ABSTRACT

A light transmitting device for use in a viewing apparatus or optical device, particularly a night vision device. The device is composed of a material which is capable of transmitting light from a remote source. Light from a visible indicator such as an LED is transferred through at least one outer flat to an inner flat of the device. The inner flat provides a signal to the user that the power supply is low. An additional outer flat and inner flat provides a signal to the user that the infrared illuminator is in operation. A projection formed along the outer periphery of the device prevents rotation and aids in assembling the device in a viewing apparatus. With the light transmitting device, there is no need for a separate device attached to the housing of an optical device for indicating power supply. The device also avoids the presence of overlapping light signals in the user's eyes, by transferring separate channels of light from locations outside the field-of-view to specific locations inside the field-of-view of an optical device.

11 Claims, 3 Drawing Sheets

LIGHT TRANSMITTING DEVICE

BACKGROUND OF THE INVENTION

1. Field of the Invention

This invention relates to a light transmitting device for use in a viewing or optical apparatus, particularly an optical device that enables a viewer to observe objects at night or under low-light conditions.

2. Description of Related Art

Night vision devices are widely used in the military to provide soldiers, aviators, and sailors with the ability to view objects at night or under low light conditions. A typical night vision device contains many optical components including an image intensifier tube and several lens elements that comprise the objective lens assembly, the collimator lens assembly, the diopter lens assembly, and the eyepiece assembly. Each of the optical elements must be precisely spaced and aligned to meet the optical performance requirements of the device.

The image intensifier tube converts visible and infrared energy into visible light. By receiving small quantities of both visible and non-visible near infrared light reflected off objects on the ground, the image intensifier amplifies the small quantities into visible light. The conversion typically requires sophisticated power supplies and circuitry to control the operation of the image intensifier tube and the sophisticated optical arrangements that direct the visible and infrared energy into the image intensifier tube.

The night vision device can be a self-contained transportable unit powered by batteries. The batteries are disposable or rechargeable and are preferably widely available. As a consequence of the power needed for operation of the device, batteries often need to be changed or recharged. When the power produced by the batteries is low, the viewing device cannot operate properly. Thus, it is important for the user to know when to replace batteries in the device, particularly when uninterrupted maximum night viewing operation is desired. It is also important to the user to know when the infrared illuminator is in operation.

ITT Corporation, the assignee herein, manufactures many night vision devices having various applications. Visible indicators such as LEDs are located in the field of view in these viewing devices. Several of these devices are discussed below.

U.S. Pat. No. 5,683,831 to Baril et al. describes a compact battery pack for a helmet mounted night vision device. The circuitry is designed to detect reduced voltage from one of the battery sets. The signal to the user is sent through a shielded cable to a small LED which is positioned within the user's field of view. When the LED flashes, this indicates that the batteries of the selected battery set are in need of replacement.

U.S. Pat. No. 5,537,261 to Palmer describes night vision binoculars having an LED disposed in the diopter cell assembly which is continually visible to the user. The LED is coupled to the CPU and lights when the power supply is drained, thereby indicating to the viewer that the batteries are low.

U.S. Pat. No. 5,157,553 to Phillips, et al., describes a collimator for a binocular viewing system. In the single objective lens arrangement, a single source image is viewed and the light from the image is divided into two separate corresponding optical outputs for binocular viewing. This is accomplished by a collimator lens assembly, a beam splitter, and two diopter cell assemblies. The collimator lens assembly re-images a source image at a substantially infinite conjugate. The rays of light leaving the collimator lens assembly are substantially parallel. The parallel light is then evenly divided by the beam splitter and directed toward the diopter cell assemblies. Diopter cell assemblies provide optical power to the split beam path, and direct the split image into two eyepiece lens assemblies by utilizing a mirror or prism.

Diopter cell assemblies can include an LED. The purpose of the LED is to superimpose a signal light over the image being viewed. For instance, a small light is superimposed over the viewed image to indicate to a viewer that the battery is low in the assembly or to indicate that an ancillary infrared light source has been turned on. The LED is typically positioned within the diopter cell assembly behind an elliptical mirror. A hole drilled into the back surface of the mirror allows light from an LED to pass through the material of the mirror. The manufacture and assembly of such a device is costly.

U.S. Pat. No. 5,347,397 to Nelson et al. describes a diopter cell assembly for a binocular viewing system having a single objective lens arrangement. The diopter cell assembly reorients an optical image from a first optical pathway to a second optical pathway. An LED is positioned over a transparent segment of a flat mirror to produce a superimposed image over the image being redirected by the diopter cell assembly, thus avoiding the problem of creating an elliptical mirror, aligning and adhesively attaching the mirror. A small aperture formed in the reflective surface of a mirror is located directly below the region of the LED. The aperture allows light from an LED to pass through the mirror and be viewed.

Of interest to the present invention is U.S. Pat. No. 5,594,254 to Palmer, assigned to ITT Corporation, the assignee of the present invention. Palmer describes an illuminator device for use with night vision devices. The device is coupled to a tripod mount and allows the user to adjust the direction of a beam of light projected by the illuminator relative to the line of sight of the night vision apparatus. The illuminator can be an LED or a laser light source.

The problem of the present viewing devices is that none can transmit light from a visible indicator located outside the field of view to a location inside the field of view of an apparatus at a desired optical location. Up to now, the devices had visible indicators located within the field of view of the user.

Thus, there remains a need for a device that transmits light from one or more visible indicators outside the field of view of the user for transferring into the field of view at desired optical locations, indicating to the viewer that the power supply is low, or that the infrared illuminator is in operation, while maintaining clearly-separated signals that can be unambiguously interpreted by the user.

SUMMARY OF THE INVENTION

Briefly described, the invention comprises a light transmitting device composed of a material capable of transmitting light from a source for use in a viewing apparatus, particularly a night vision device.

Light from at least one visible indicator is transferred to the device through at least one outer flat located on the outer periphery of the device. An example of a visible indicator is an LED or a laser light source. The LED is remote and located outside the field of view or line of sight of the night vision device. The external location of the visible indicators is generally in the circuit board. By way of a second inner flat located on the inner periphery of the device, the illuminated light from the LED is transmitted to a desired optical location in the field of view of the user. The light transmitting device is composed of a plastic material, or any suitable material that enables light to emanate.

The present device can be mounted in a night vision device. For example, one such device is described in Improved Monocular Night Vision Device, manufactured by ITT Corporation, U.S. patent application Ser. No. 09/098, 098 to Bryant et al., filed Jun. 16, 1998, the disclosure of which is incorporated herein.

One of the advantages of the invention is that it obviates the need for a separate device attached to the housing which requires extra assembly steps. The light transmitting device is relatively thin, allowing it to be housed above a light emitting diode on the circuit board within the housing of a viewing apparatus, thereby acting as a conduit to the user.

In an alternate embodiment of the invention, there are at least two outer flats and two inner flats. One inner flat indicates whether the infrared illuminator is in operation. A second inner flat flashes to provide a signal to the user that the batteries need to be replaced. By simply looking through the eyepiece assembly and seeing the signal, the user can replace batteries prior to them going dead to ensure proper operation of the viewing apparatus. An additional advantage of the light transmitting device is that it allows the viewer to know when the infrared illuminator is on, as a second inner flat is either illuminated or is not illuminated.

The application of the light transmitting device is particularly useful where an image intensifier tube is used to provide night vision capabilities, such as in night vision goggles, and in hand-held night vision devices, either monocular or binocular, which require power from batteries.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE INVENTION

During the course of this description, like numbers will be used to identify like elements according to the different views which illustrate the invention.

Figure 1:
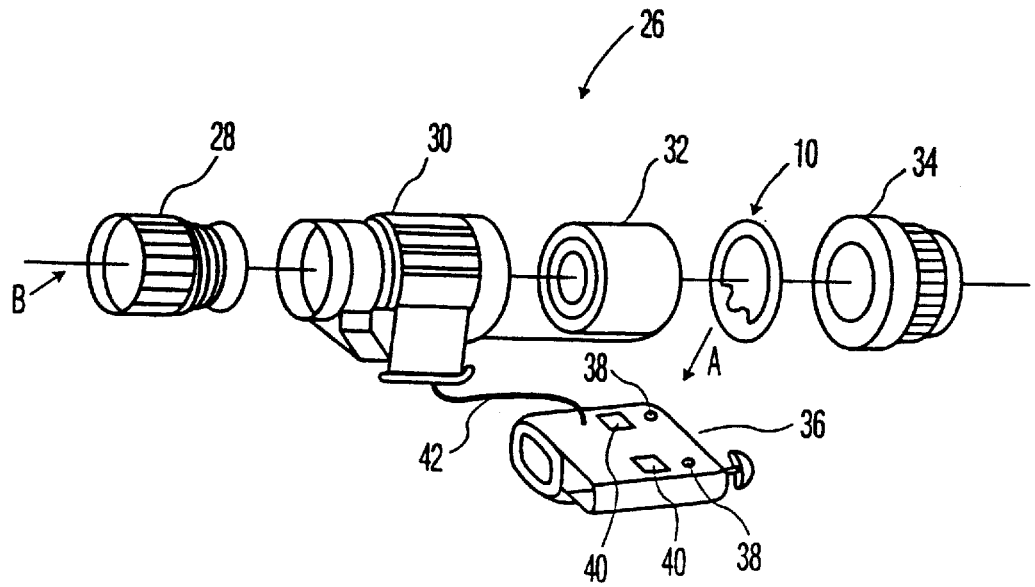
FIG. 1 is a view of the light transmitting device in the context of an exploded perspective view of a viewing apparatus.

A viewing apparatus 26 showing the placement of the light transmitting device 10 is illustrated in FIG. 1. The viewing apparatus 26 includes an objective lens assembly 28, a housing 30, an image intensifier 32, the light transmitting device 10 and eyepiece assembly 34. Image intensifier 32 is connected via connectors 40 to a circuit board 36. The flex circuit 42 off of the image intensifier tube goes through the housing 30 and connects to the circuit board 36. The circuit board 36 contains various control circuits needed for the operation of the apparatus 26. When the apparatus 26 is assembled, the light transmitting device 10 is positioned over the circuit board 36 as shown in the direction of arrow A. When the viewing apparatus 26 is assembled, LEDs 38 on the circuit board 36 are located under the light transmitting device 10. When a user looks through the eyepiece lens assembly 34, there is a line of sight or field of view, generally indicated along line B.

Figure 2:
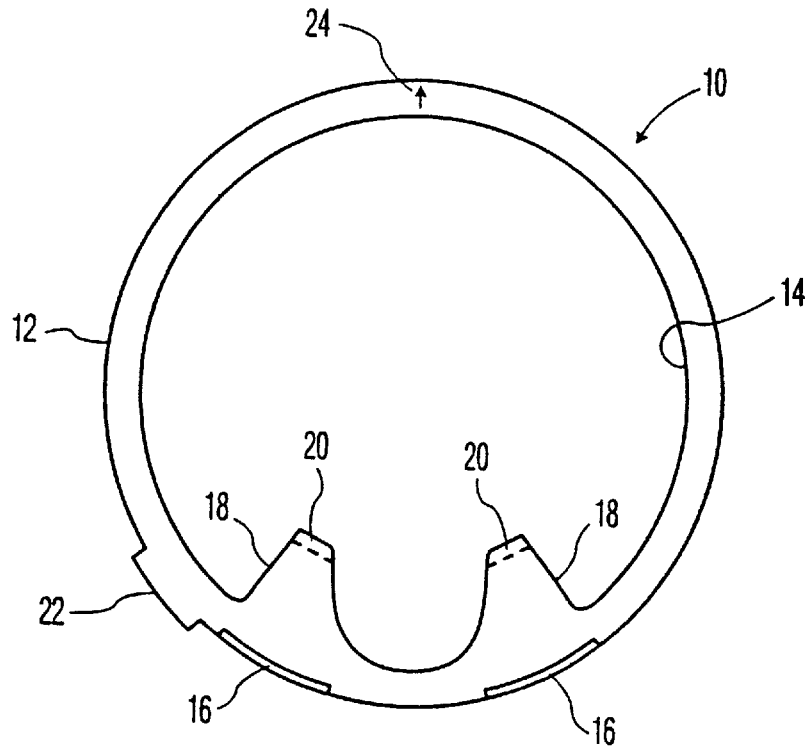
FIG. 2 is an orthographic view of the device as seen from the front side.

The light transmitting device 10 shown in FIG. 2 has an annular shape since the device is for mounting within a viewing apparatus 26 that is substantially cylindrical in shape. The shape of the device 10 can be varied, depending upon the shape of the viewing apparatus employed.

The light transmitting device 10 has an outer periphery 12 and an inner periphery 14. A pair of polished flats 16 are shown on the outer periphery 12. The outer flats 16 receive light from LEDs 38 on the circuit board 36, which is outside the field-of-view of the user. Located on the inner periphery 14 is a pair of projections or light pipes 18. At the end of the projections 18 are a pair of inner flats 20 which, in conjunction with flats 16, transmit light to a desired optical location. Inner flats 20 can either be polished or diffused. Although the device 10 is depicted with two inner flats 20 and two outer flats 16, the device 10 is operable with one outer flat and one inner flat. If desired, the device 10 can have three or more outer and inner flats, depending on the needs of the user.

Projection 22 formed on the outer diameter 12 of the device 10 prevents rotation of the light transmitting device 10 when assembled in the viewing apparatus 26. The projection 22 shown is substantially rectangular in shape, but can vary depending on the chosen shape of the device 10, and depending upon the selected corresponding groove or recess (not shown) within which it is housed in the apparatus 26. The antirotation projection 22 could also be realized as a notch or hole in other embodiments. When assembled, the projection 22 ensures that the signal appearing in the field of view is always in the same location, and ensures that the light-collecting flats 16 align with the LEDs 38.

Figure 3:
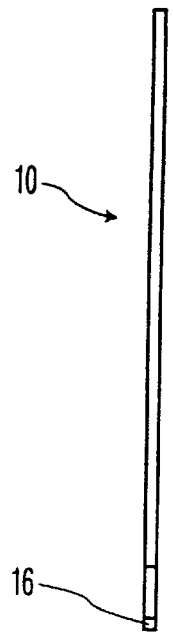
FIG. 3 is a side view of the device.

FIG. 3 is a side view of the device 10 showing an outer peripheral flat 16. The thickness of device 10 shown in FIG. 3 ranges between 0.03 and 0.05 inches, but can exceed this range depending upon the size of the light transmitting device 10. The light transmitting device 10 has an outer diameter of approximately 1.5" and an inner diameter of approximately 1.25". The diameter can be varied depending upon the size of the device 10. The dimensions of the device 10 are not critical, however, thickness is a function of the width of the device 10. Thus, if a thicker material is desired, the device 10 will have a corresponding wider diameter.

Figure 4:
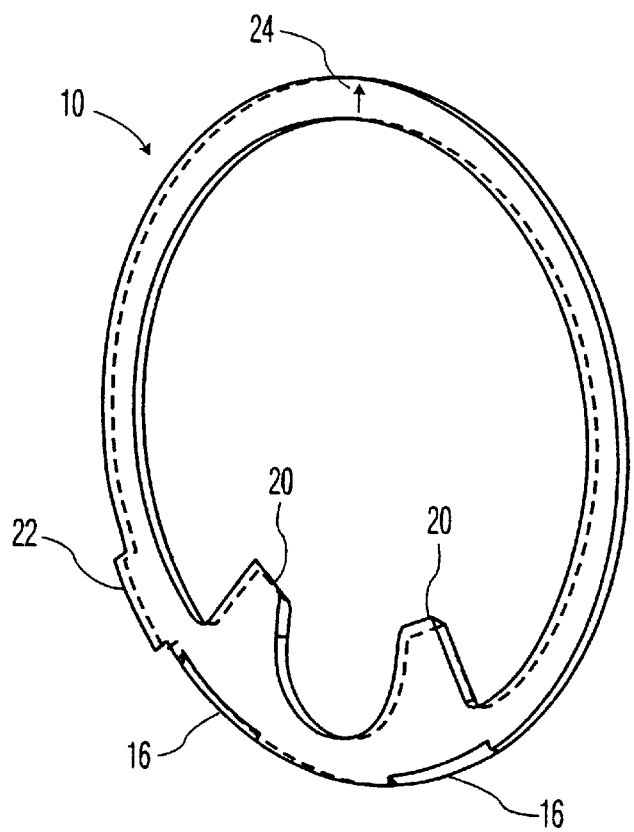
FIG. 4 is a front isometric view of the device.
Figure 5:
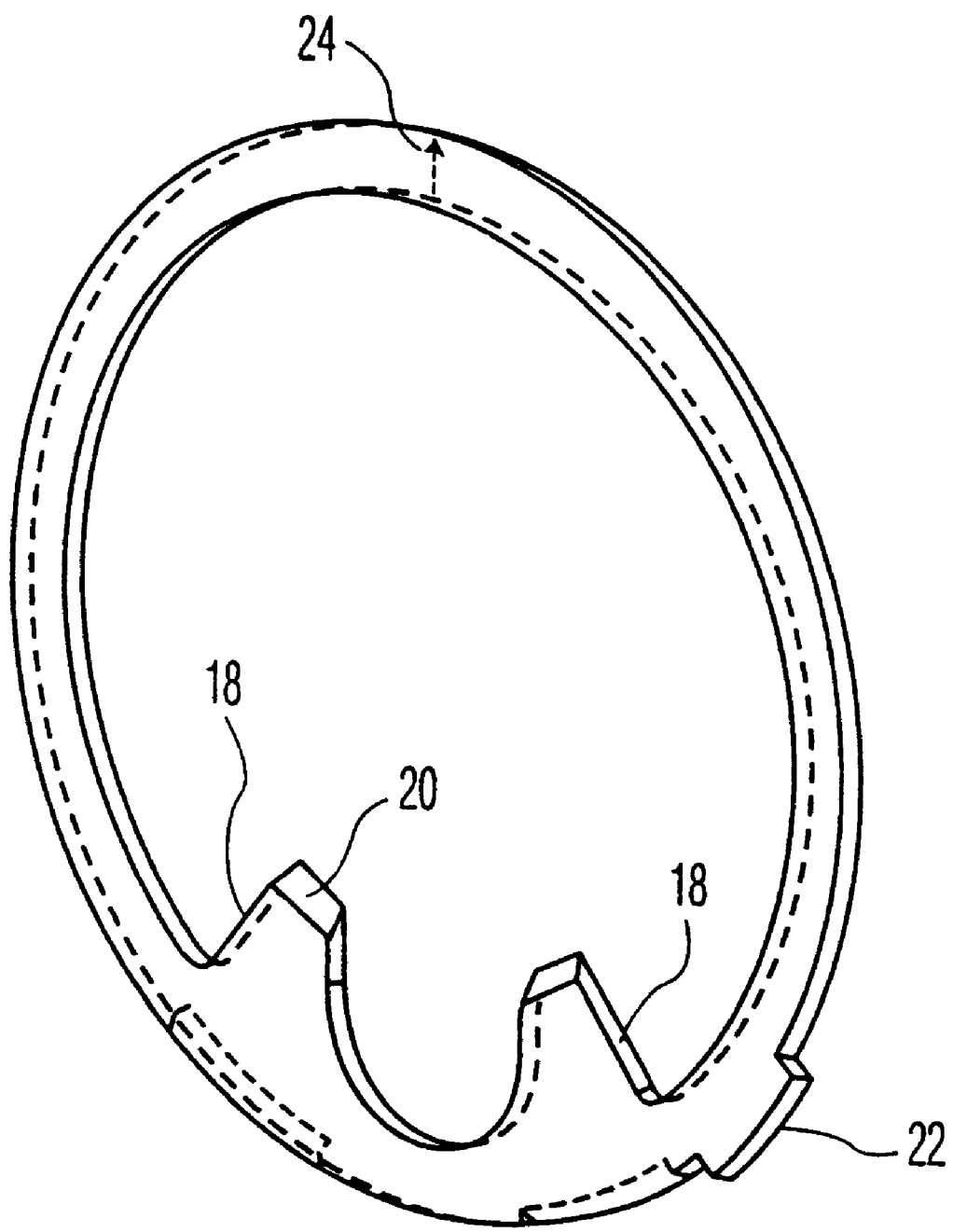
FIG. 5 is a rear isometric view of the device.

The structure of the flats 20 in relation to the light transmitting device 10 can be seen in FIGS. 4 and 5. At the end of projections 18 are flats 20. Depending upon the viewing optics employed, the inner flats 20 are either polished or diffused. The flats are approximately 0.090" long and 0.031" wide, and are partially tetrahedral in shape. The flats 20 of the present invention have a consistently increasing perimeter as they approach the inner diameter when viewed from the center of the device 10 and are therefore partially tetrahedral in shape.

The optimum angle between inner flats 16 is approximately 45° in reference to the optical axis as shown in FIG. 1, when there is more than one inner flat present in an embodiment of the invention. When the apparatus 26 is in operation, the flats 20 are the only portions of the device 10 from which light is seen to emanate.

Appearing at the top of the device 10 is a symbol or mark 24 which aids in the assembly of the apparatus 26. The mark can consist of a word, such as "up" or a symbol 24 as shown. The symbol 24 shows the assembler the proper orientation of the ring in relation to the assembled apparatus 26, and ensures that light from the indicators is projected in the proper direction. In FIG. 5, the symbol 24 as shown is not as readily visible as in FIG. 4. This also aids in determining whether the ring is facing the correct way in the assembled apparatus 26.

In the present invention, one of the inner flats 20 flashes to provide a signal to the user that the batteries are low. The other flat indicates that the infrared illuminator is on. The dual functions of signaling low batteries and of indicating whether the illuminator is in operation are separated into channels so that the user can readily distinguish the signals by position in the field-of-view, such that the visible signals are separated and do not overlap.

The device 10 is composed of a plastic material, preferably clear optical acrylic, although alternative material such as polycarbonate can be employed in reaching the same results, as polycarbonates exhibit water-clear clarity with visible-light transmission of approximately 90%. The plastics chosen must have characteristics of clear color and stability upon aging. Plastics are generally used in the apparatus 26 to reduce overall weight and cost.

The particular index of refraction of the device 10 must be higher than the index of refraction of the surrounding materials to achieve total internal reflection. A typical index of refraction is approximately 1.5. The projections or light pipes 18 must be of such a height that they will transmit light to the peripheral viewing field of the user. The direction of the light can be reversed if the indicator is located inside the device and the source is outside, since the outer flats 16 and inner flats 20 will direct light, whether received or transmitted.

While the invention has been described with reference to the preferred embodiment thereof, it will be appreciated and understood by those of ordinary skill in the art that many modifications can be made to the parts that comprise the invention without departing from the spirit and scope thereof, which is defined solely by the appended claims.

What is claimed is:

1. A light transmitting device for transferring light in a viewing device having a predetermined line of sight, comprising:
    an annular member which permits the transfer of light from a source to a desired optical location, said annular member having an inner periphery and an outer periphery;
    at least one external flat located on the exterior diameter of said annular member for receiving light from a source; and
    at least one internal flat located on the interior diameter of said annular member for transmitting light to said desired optical location, wherein said optical location is along said line of sight and provides a signal to the user.

2. The device of claim 1, further comprising a projection on said annular member for preventing movement of said light transmitting device within said viewing device.

3. The device of claim 2, wherein said at least one external flat and said at least one internal flat are polished.

4. The device of claim 2, wherein said at least one external flat is polished and said at least one internal flat are diffused.

5. The device of claim 2, wherein said annular member has a symbol located on the surface of said member for aiding assembly of said device in said viewing apparatus.

6. The device of claim 5, wherein said annular member is composed of a plastic material.

7. The device of claim 6, wherein said viewing device is a night vision apparatus.

8. A light transmitting device for use in a viewing apparatus, comprising:
    an annular light conducting member having an outer periphery and an inner periphery;
    input means comprised of at least one outer flat located on the outer periphery for receiving light from a source;
    output means comprised of at least one inner flat located on the inner periphery which coacts with said input means for transmitting light to an optical location; and
    means located at the annular member for preventing rotation of the device in the viewing apparatus;
    wherein said at least one outer flat is polished and said at least one inner flat is diffused.

9. A light transmitting device for use in a night vision apparatus, comprising:
    an annular light conducting member having an outer periphery and an inner periphery;
    input means comprised of at least one outer flat located on the outer periphery for receiving light from a source;
    output means comprised of at least one inner flat located on the inner periphery which coacts with said input means for transmitting light to an optical location; and
    means located at the annular member for preventing rotation of the device in the night vision apparatus;
    wherein said annular member is composed of plastic material and has a symbol located on its surface for aiding assembly of said device in said night vision apparatus.

10. A light transmitting device for use in an optical apparatus, comprising:
    an annular member which permits light to be transmitted from a source to an optical location, said annular member having an inner periphery and an outer periphery;
    at least one outer flat located on said outer periphery for receiving light from said source, said source being outside the field-of-view of said optical apparatus;
    at least one inner flat located on said inner periphery for transmitting light to said optical location, said optical location being inside the field-of-view of said optical apparatus; and
    a projection on the annular member for preventing movement of the device within the optical apparatus;
    wherein said at least one outer flat is polished and said at least one inner flat is diffused.

11. A light transmitting device for use in a night vision apparatus, comprising:
    an annular member which permits light to be transmitted from a source to an optical location, said annular member having an inner periphery and an outer periphery;
    at least one outer flat located on said outer periphery for receiving light from said source, said source being outside the field-of-view of said night vision apparatus;
    at least one inner flat located on said inner periphery for transmitting light to said optical location, said optical location being inside the field-of-view of said night vision apparatus; and
    a projection on the annular member for preventing movement of the device within the night vision apparatus;
    wherein said annular member is composed of plastic material and has a symbol located on its surface for aiding assembly of said device in said night vision apparatus.

* * * * *